UNITED STATES PATENT OFFICE.

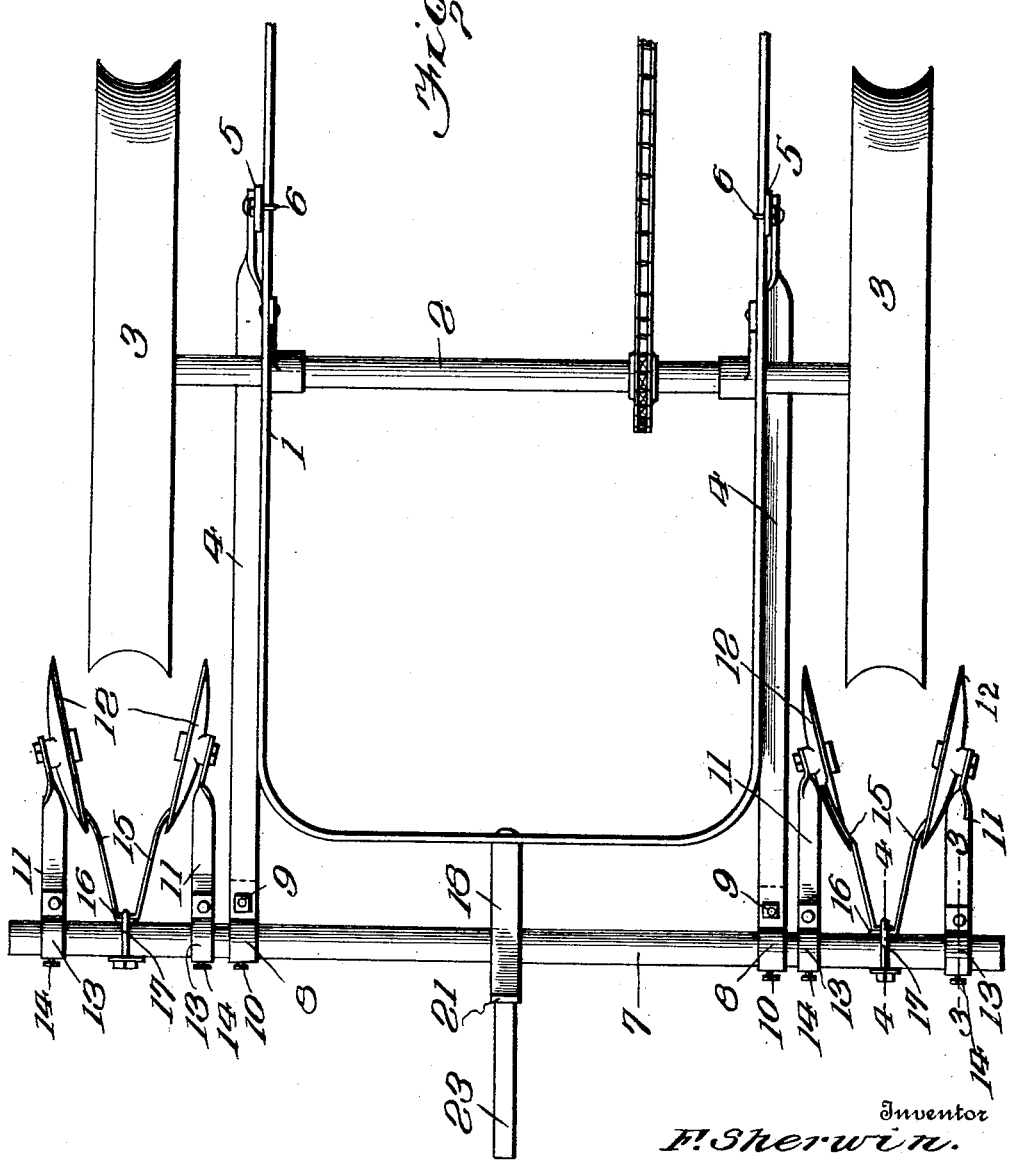

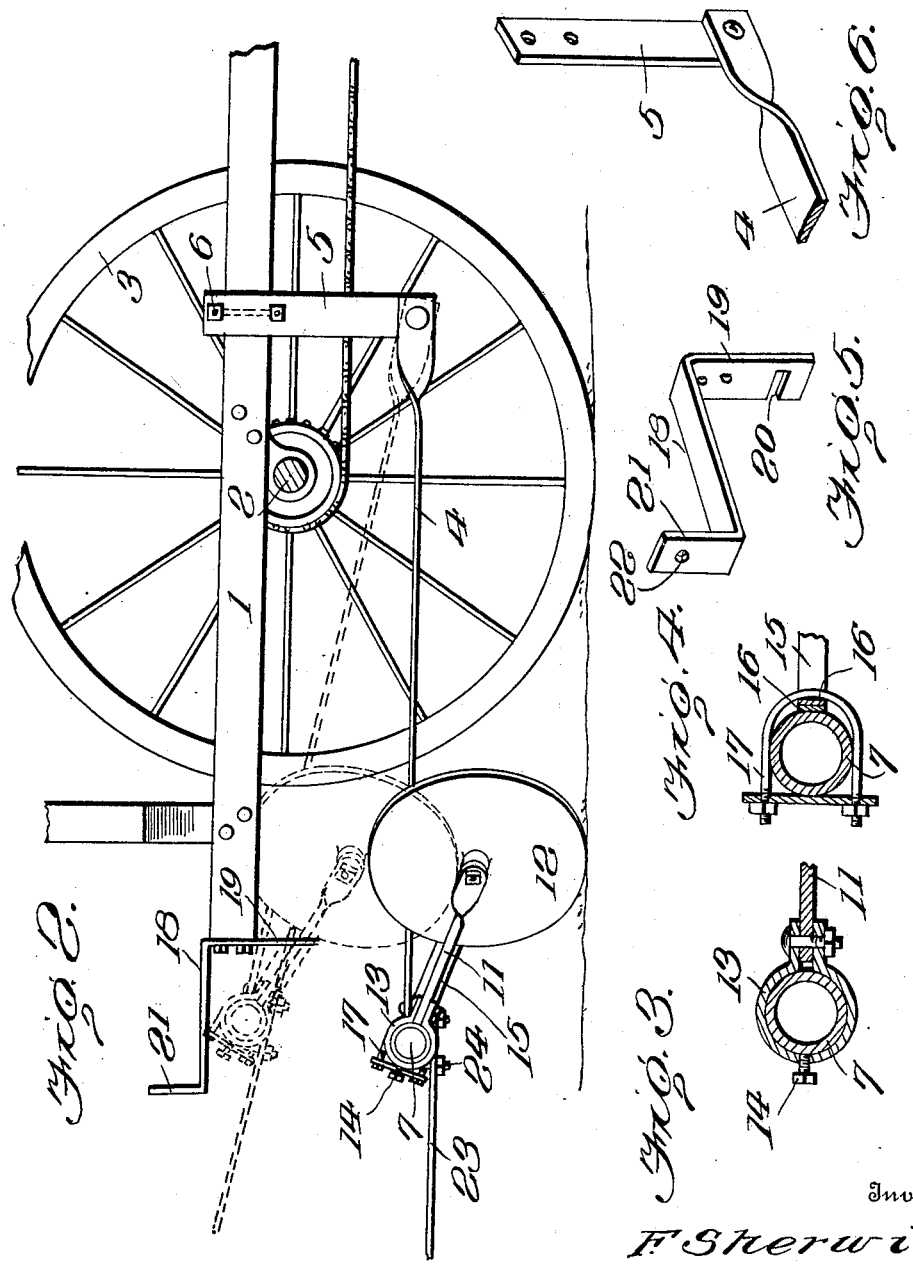

FRANK SHERWIN, OF BROOKINGS, SOUTH DAKOTA.

ATTACHMENT FOR PLANTERS.

1,220,014.

Specification of Letters Patent.

Patented Mar. 20, 1917.

Application filed February 7, 1916. Serial No. 76,648.

*To all whom it may concern:*

Be it known that I, FRANK SHERWIN, a citizen of the United States, residing at Brookings, in the county of Brookings and State of South Dakota, have invented certain new and useful Improvements in Attachments for Planters, of which the following is a specification.

This invention is a "blind-plowing" attachment for planters.

Blind plowing is usually done with a cultivator from one to five days after the corn is planted and before the plants come up, by following the marks left by the planter, the object of this early cultivation being to remove any weeds which may have found lodgment in the soil. My invention provides a simple and efficient mechanism whereby this blind plowing or initial cultivation is done at the same time the corn is planted, the result of the operation being the formation of a ridge of dirt immediately over the planted corn, which ridge is harrowed down before the corn comes up so that any weeds that might start will be entirely destroyed.

The invention is illustrated in the accompanying drawings and consists in certain novel features which will be hereinafter first fully described and then more particularly pointed out in the claims following the description.

In the annexed drawings:

Figure 1 is a plan view of my improved attachment, showing so much of a planter frame as is necessary to give a clear understanding of the arrangement of the attachment;

Fig. 2 is a side view of the same;

Fig. 3 is a detail section on the line 3—3 of Fig. 1;

Fig. 4 is a detail section on the line 4—4 of Fig. 1;

Fig. 5 is a detail perspective view of the supporting bracket by which the attachment may be held in a raised position and which provides a mount for the land-marker;

Fig. 6 is a detail perspective view of a portion of the supporting structure.

The planter frame, indicated at 1, may be of any well known type and is mounted upon an axle 2 carrying the ground wheels 3 in the usual manner.

My improved attachment comprises draw bars 4 which are disposed at the sides of the planter frame and below the axle as shown and have their front ends pivoted to the hangers 5 which are secured to the sides of the planter frame 1. The hangers 5 are attached to the planter frame by clips or U-bolts 6, or similar devices which will pass around the frame and hold the hangers thereto. It will be noted that this arrangement permits the hangers to be shifted longitudinally of the side bars of the main frame so that the draw bars 4 may be properly adjusted according to the requirements of any particular work or the peculiar construction of the planter to which the attachment is to be applied. It is also to be noted that these clips or clamps by which the hangers are attached to the planter frame are the only devices used to fasten the attachment to the planter so that an unskilled person may secure the attachment in its working position easily and in a short period of time.

The rear ends of the draw bars 4 are constructed to support a cylindrical bar or rod 7 which constitutes the main support of the attachment. This bar or rod 7 is disposed transversely of the planter in rear of the same and is preferably tubular so as to possess the requisite strength without unnecessary weight. Should it be desired sometimes to increase the weight of the device so as to hold the ground-engaging members more deeply in the soil, the bar may be filled with sand or other material and thereby weighted. The rear ends of the draw-bars 4 are carried around the transverse rod or bar 7 in the form of loops, indicated at 8, the extremities of the bent or looped portions being secured to the main portions of the draw bars by bolts 9, as will be readily understood. Set screws 10 are also fitted in these loops and bear against the bar or rod 7 so that the draw bars may be adjusted along the main transverse rod or bar and thereby made to accommodate the attachment to planters of different widths. It is also to be noted that the described construction permits the draw-bars to be adjusted about the transverse tubular bar as a center so that the device may be fitted to planter frames of different heights.

Disposed upon the transverse cylindrical bar, laterally beyond the draw bars, are arms 11 which extend forwardly from the cylindrical bar and constitute bearings at their forward extremities for cultivator disks 12. These arms 11 and the disks 12 are so arranged that the disks are disposed on opposite sides of and at equal distances from the central plane of the planter wheel 3 immediately in advance of the disks, and also in such position that the disks will be at equal distances in advance of the main bar. This arrangement causes the disks to work in opposition to each other so that the dirt turned up by them will be deposited directly over the seed dropped by the planter and form a ridge which will cover the seeds with certainty. The arms 11 are mounted upon the main bar 7 by loops 13 to which the rear ends of the arms are attached and which encircle the transverse bar and are held in a set position thereon by a set screw 14 mounted in the loop and bearing upon said bar 7. This arrangement permits the arms to be adjusted along the main bar and also adjusted about the same as a center so that the disks may be brought into the proper position to perform the desired work. A pair of scrapers 15 is provided between the coacting disks and these scrapers consist each of a flat blade, preferably resilient, which has its forward end free and bearing against the inner face of the adjacent disk. The rear end of the scraper is bent sharply, as shown at 16, so as to pass through a clip 17 and be clamped to the main bar 7 thereby. It will be noted that the rear bent ends 16 of the scrapers overlap so that a single clip will serve to secure a pair of the scrapers to the main bar while, at the same time, sufficient surface is provided to permit the scrapers to be adjusted in such manner that they will accommodate themselves to the adjustment of the cultivator disks and will remain in contact with the inner faces of the same so as to keep them clean. The clip 17 will also permit the scrapers to be adjusted about the main bar 7 as a center.

To the rear end of the planter frame, at the center thereof, I secure a bracket 18 consisting of a flat bar or blade having a downturned front end 19 which is secured to the planter frame and is provided with a notch 20 in one side edge. The rear end of the plate is upturned, as shown at 21, and provided with an opening 22 to receive a pivot by which the ordinary land-marker of the planter may be attached to the bracket. It will be noted that this arrangement preferably brings the land-marker in rear of my attachment so that no part of the marker will be in a position to interfere with the operation of the attachment or accessibility of the same should it be necessary to give the attachment any unusual attention. At the center of the main bar 7 of the attachment, I provide a lifting arm 23 which projects both rearwardly and forwardly of the said main bar and constitutes a handle by which the attachment may be lifted from the ground when it is desired to move the planter over a road or from one field to another field. The front end of this lifting member extends into the plane of the forward end 19 of the bracket 18 and is adapted to engage in the notch 20 whereby the attachment may be supported in a raised position, as indicated by dotted lines in Fig. 2.

It is thought the use and advantages of my device will be readily understood and appreciated from the foregoing description, taken in connection with the accompanying drawings. The draw bars or shafts 4 will, of course, transmit a pull from the planter frame to the main rod or bar 7 of the attachment so that the attachment will be drawn over the field immediately in rear of the planter. The cultivator disks will take into the ground immediately in rear of the planter wheels and immediately in line with the planted seed, thereby turning the surface soil over onto the seed so as to form a dust mulch and, consequently, save one cultivation during the season. The draw bars are flat steel bars so that the attachment will be very strong and rigid without requiring the use of a large number of braces which would add to the weight of the entire apparatus. The disks will form small ditches at each side of the ridge and as the disks are set exactly opposite each other, the soil will be thrown into a perfect ridge and the soil then thoroughly pulverized, the ridges and ditches being uniform throughout their length. The lifting member or handle 23 is secured upon the main bar by a clip 24 so that it may be adjusted both longitudinally of the main bar 7 and around the same to accommodate any unusual peculiar characteristics of the planter to which the device is attached. Inasmuch as the cultivator disks are set exactly opposite each other, they form two ditches of equal dimensions with a ridge between the ditches somewhat higher than the surrounding soil. The ridge permits the harrow or weeder, in subsequent cultivations, to take hold of the earth exactly over the sprouting corn, thereby thoroughly cleaning all weeds from the hills. The ditches at the sides of the ridge will retain heat and moisture and very materially add to the warmth of the soil in which the corn is growing and hasten the growth of the same. Inasmuch as the main bar is cylindrical or round in cross section, I am enabled to adjust the several parts of the attachment both transversely of the planter and in a vertical plane so as to bring these parts into the exact relative arrangement most conducive to the desired results. The device is composed of very few parts which are simple in their construction and may, therefore, be rapidly and economically produced while they will be found highly efficient in operation for the purposes for which they are designed.

Having thus described the invention, what is claimed as new is:

1. An attachment for planters comprising draw bars adapted at their front ends to be connected with a planter frame, a rod of circular cross section fitted in the rear ends of said draw bars, means for securing the draw bars to the said rods in any position of annular or longitudinal adjustment thereon, arms secured to said rod laterally beyond the respective draw bars and adjustable longitudinally and annularly thereof, cultivator disks mounted on the free ends of said arms, and scrapers secured to the said rod and adjustable annularly and longitudinally thereon and having their free ends bearing against the opposed faces of the disks.

2. The combination of a rod of circular cross section, arms secured to said rod and adjustable longitudinally and annularly thereon, cultivator disks carried by said arms, scrapers bearing against opposed faces of said disks and having their rear extremities overlapping against the rod, and a clip secured to the rod and embracing the same and the overlapping extremities of the scrapers.

3. In a device for the purpose set forth, the combination of a main transverse bar, arms fitted thereto and adjustable longitudinally and annularly thereof, disks mounted on the forward extremities of said arms, and scrapers secured to the main bar between the arms and adjustable longitudinally and annularly thereof and having their forward free ends bearing against the inner faces of the disks.

4. The combination with a planter frame, of a bracket secured to the rear end thereof and having an upstanding rear extremity forming a land-marker support and a depending front extremity provided with a notch in one side edge, a cultivator attachment supported from and pivoted below the planter frame, and a lifting member on said cultivator attachment adapted to engage the notch in the depending front extremity of said bracket.

In testimony whereof I affix my signature.

FRANK SHERWIN. [L. S.]

Copies of this patent may be obtained for five cents each, by addressing the "Commissioner of Patents, Washington, D. C."